(12) United States Patent
Rammos et al.

(10) Patent No.: US 10,665,032 B2
(45) Date of Patent: May 26, 2020

(54) REAL-TIME MOTION FEEDBACK FOR EXTENDED REALITY

(71) Applicant: Accenture Global Solutions Limited, Dublin (IE)

(72) Inventors: Perikles Rammos, Dublin (IE); Cian O'Hagan, Dublin (IE); Eoghan Kidney, Dublin (IE); Shannon Power, Dublin (IE); Navdeep Sharma, Dublin (IE); Shane O Meachair, Dublin (IE); Finbarr S. Tarrant, Dublin (IE); Richard Mcniff, Dublin (IE); Sarah Healy, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/266,274

(22) Filed: Feb. 4, 2019

(65) Prior Publication Data

US 2020/0118340 A1    Apr. 16, 2020

Related U.S. Application Data

(60) Provisional application No. 62/744,876, filed on Oct. 12, 2018.

(51) Int. Cl.
*G06T 19/00* (2011.01)
*G06K 9/62* (2006.01)
*G06N 20/00* (2019.01)

(52) U.S. Cl.
CPC .......... *G06T 19/006* (2013.01); *G06K 9/6256* (2013.01); *G06N 20/00* (2019.01)

(58) Field of Classification Search
CPC .............. G06T 19/006; G06K 9/00671; G06K 9/6256; G06N 20/00
See application file for complete search history.

(56) References Cited

U.S. PATENT DOCUMENTS

2015/0070388 A1*   3/2015   Sheaffer ................. G02B 27/01
                                                                  345/633
2016/0284125 A1*   9/2016   Bostick .............. G02B 27/0172
(Continued)

FOREIGN PATENT DOCUMENTS

WO    WO 2018/0134143 A1    7/2018

OTHER PUBLICATIONS

Onur Can Sert et al., U.S. Appl. No. 16/446,205, filed with the U.S. Patent and Trademark Office on Jun. 19, 2019, pp. 1-66, not yet published.

(Continued)

*Primary Examiner* — Jeffery A Brier
(74) *Attorney, Agent, or Firm* — Brinks Gilson & Lione

(57) ABSTRACT

Systems and methods for predictively responding to real-time sensor data from an computer-augmented environment are provided. A system may receive sensor data from the computer-augmented environment. The system may obtain a feature model, a prediction model, and a filter criteria. The system may derive, based on the feature model and the sensor data, a first event. The system may determine the first event is associated with an authorized event identifier in the filter criteria. The system may forecast, based on the authorized event identifier and the prediction model that a second event occurs after the first event. The system may transmit an action message to the computer-augmented environment, the action message indicative of the second event. Updates to the feature model, the prediction model, and/or the filter criteria may occur in batch using machine learning and statistical analytics while the real-time platform predictively responds to the sensor data.

20 Claims, 8 Drawing Sheets

(56) References Cited

U.S. PATENT DOCUMENTS

2018/0053351 A1* 2/2018 Anderson ............... G06F 3/011
2018/0286099 A1 10/2018 Kozloski et al.

OTHER PUBLICATIONS

Saad M. Ismail et al., "Statistical Binarization Techniques for Document Image Analysis," Journal of Computer Science, dated Mar. 1, 2018, pp. 23-36, vol. 14, Issue 1, published online by Science Publications at URL https://thescipub.com/pdf/10.3844/jcssp.2018.23.36.

EPO Communication issued in European Patent Application 19195968.3 dated Feb. 24, 2020, 14 pages.

* cited by examiner

REAL-TIME MOTION FEEDBACK FOR EXTENDED REALITY

CROSS REFERENCE TO RELATED APPLICATIONS

This application claims the benefit of U.S. Provisional Application No. 62/744,876 filed Oct. 12, 2018, the entirety of which is hereby incorporated by reference.

TECHNICAL FIELD

This disclosure relates to extended reality and, in particular, to machine learning enhancements to extended reality.

BACKGROUND

Extended Reality may include real-and-virtual combined environments and human-machine interactions generated by computer technology. A human's interaction in a physical, virtual or combined space may be enhanced through machine-generated information that is designed to augment a user's experience. Extended reality may include, for example, augmented reality (AR), augmented virtuality (AV), virtual reality (VR), mixed reality (MR). Extended reality systems may rely on real-time data acquisition and processing in order to generate information based on changes in a physical or virtual space.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
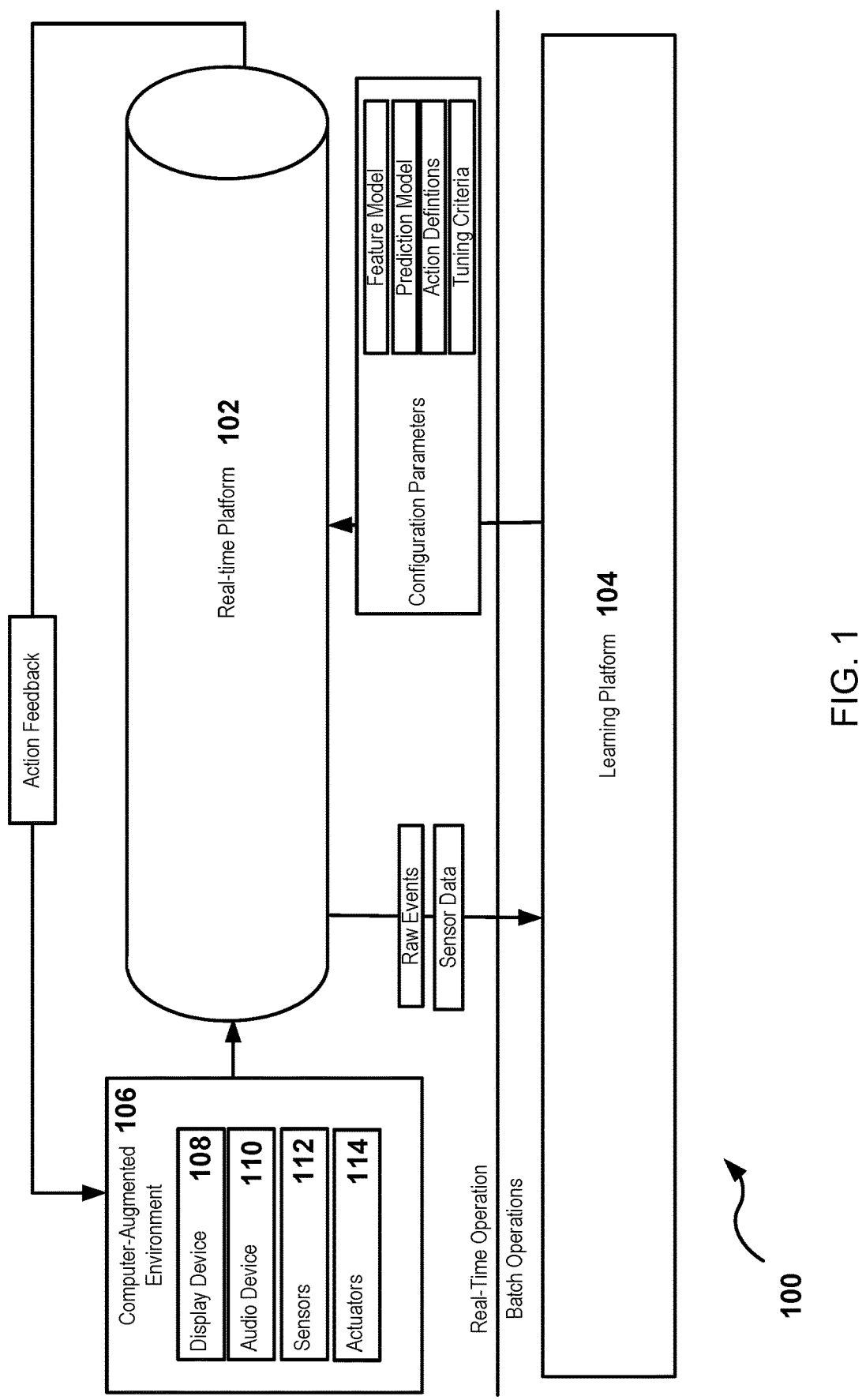
FIG. 1 illustrates an example of a real-time feedback system.

A computer-augmented environment may include an environment where sensors collect information to enhance a physical and/or virtual space. A human's interaction in a physical, virtual or combined space may be enhanced through machine-generated information that is designed to augment a user's experience. For example, a computer-augmented environment may include extended reality (XR) where real-and-virtual combined environments and human-machine interactions are generated by computer technology based on sensor data acquired from a physical space. Extended reality may include, for example, augmented reality (AR), augmented virtuality (AV), virtual reality (VR), mixed reality (MR). Computer-augmented environments may rely on real-time data acquisition and processing in order to generate information based on changes in a physical space, a virtual space, or both. In other examples, the commuter augment environment may access or include other systems, such as drones, self-driving cars, conveyor belts, etc.

Computer-augmented environments may derive information from sensors that provide a rich source of information about an environment. Computer-augmented environments may provide information to a user based on the current or historical state of an environment, but inadequately provide feedback based on possible future states. Moreover, the large amount of information derived from sensors may create storage and processing inefficiencies. Processing and storage demands by machine learning and artificial intelligence frameworks may further constrain the real-time (or near real time) experience.

The systems and methods described herein may, among other features described herein, apply analytics and machine learning to assist and guide the user experiences in a computer-augmented environment based on virtual reality and/or augmented reality scenarios. Historical and/or live data may be leveraged to predict the next actions of a user. For example, corrective suggestions may guide the user to avoid predicted mistakes. Alternatively or in addition, the predictions may be used as a basis to improving the overall performance of a computer-augment environment.

By way of introductory example, a system may receive configuration parameters including a filter criteria and a prediction model. The filter criteria may include authorized event identifiers and a prediction model. The system may receive, in real time, sensor data from a computer-augmented environment. The computer-augmented environment may include a display device, such as a headset, configured to display a virtual scene related to a physical space. The system may generate events derived from the sensor data, the events indicative of movement in the physical space. The system may select, from the generated events, only the events corresponding to the authorized event identifiers included in the filter criteria. The system may forecast, based on the prediction model and at least one of the selected events, an event. The system may generate an action message indicative of the forecasted event. The system may cause the computer-augmented environment to display the action message before the forecasted event occurs.

In another example, the system may obtain sensor data from a historical database. The sensor data may have been previously created by sensors included in a computer-augmented environment. The system may generate a first event derived from the sensor data. The system may determine, based on a prediction model, a confidence measurement of a second event occurring after the first event. The system may determine the confidence measurement is greater than a confidence threshold. The system may generate, in response to the confidence measurement being greater than the confidence threshold, a filter criteria that authorizes a real-time platform to forecast the second event with the prediction model and communicate messages to the computer-augmented environment based on the second event. The system may transmit the filter criteria and the prediction model, as configuration parameters, to the real-time platform.

One example of a technical advancement provided by the system and methods described herein may be that processing time is improved by performing event reduction to filter inputs to models used to derive current events or predict future events. For example, the confidences of certain predictions may be determined in advance. Filter criteria may, generated using confidence thresholds, may establish which features should be applied to the prediction model, resulting in an over-all reduction of event processing. The confidence thresholds may be tuned based on the computer-augmented environment, the user, or other relevant factors. Lower confidences (i.e. a greater number of accepted predictions) may be acceptable where user actions are high risk or dangerous activities. Higher confidences may be accepter able where accurate prediction is desirable.

Another technical advancement provided by the systems and methods described herein may be that the models, settings, and logic that is access to process sensor data may be enhanced and deployed to multiple real-time processing systems. For example, a real-time learning platform may enhance the feature model, the selection model, and/or the filter criteria while real-time platforms operate in real time. The real-time platforms may forward sensor data to the learning platform according to pre-established protocols that minimize coupling and maximize cohesion between a computer-augmented environment, the real-time platform, and the learning platform. The learning platform may tailor the feature models, the prediction models, and/or the filter criteria based on computer-augmented environment(s), individual users, or other relevant factors. The learning platform may perform deployment and updates where customized models and parameters are configured on real-time platforms. Additional or alternative technical advancements are made evident in the system and methods described herein.

FIG. 1 illustrates an example of a real-time feedback system 100. The system 100 may generate insights and actions from extended reality data. The system 100 may derive features based on the acquired data. The features may be inputted into multiple analytics models. For example, the analytics models may be trained based on the features. The system 100 may access the trained models to generate predictions from the live stream and communicate feedback to users in real time. The system 100 may learn from past users to improve the performance of current and future users.

The system 100 may include a real-time platform 102, a learning platform 104, and/or a computer-augmented environment 106. The real-time platform 102 may receive real-time sensor data and/or raw events originated by the computer-augmented environment 106. The real-time platform 102 may generate action feedback for the computer-augmented environment 106. The action feedback may be indicative of predicted user actions. For example, the action feedback may include information communicated to a user via one or more device, such as a display device, a speaker, an actuator that provides physical feedback or some other device that conveys information through visual, physical, or audible feedback. In one example, the action feedback may include a message generated in response to predicting one or more events. In another example, the action feedback may include an instruction to activate an actuator, such as a haptic actuator, which causes a user to feel physical sensation.

The real-time platform 102 may derive events from the computer-augmented environment 106 over one or more time spans. The events may be filtered by feature selection and applied as an input to a trained prediction model. Event reduction may utilizes a correlation investigation to keep the most important features for prediction and/or to reduce computation time. The trained prediction model may utilize the selected events as input to infer future events (i.e. the user's future actions). These predicted events, or messages mapped to the events, may be passed back to the computer-augmented environment 106 where recommendations, warnings or guidelines may be provided to the user in real-time.

The learning platform 104 may train and/or generate models, logic, settings, and other parameters for the real-time platform 102. For example, the learning platform 104 may deploy and/or configure the real-time platform 102 (or multiple instances of real-time platforms). The learning platform 104 communicate configuration parameters to the real-time platform 102. The configuration parameters may include models, logic, settings, and other information accessible to the real-time platform 102 to analyze sensor data, predict events, generate action feedback, reduce events, improve processing time, and/or perform other operations contemplated herein. The configuration parameters may be tailored to a particular computer-augmented environment, XR scenario, and/or user of the computer-augmented environment 106. Alternatively or in addition, the configuration parameters may be tailored to increase the performance of the real-time platform 102 in terms of processing speed, memory usage, throughput, latency, and other performance measurements.

In some examples, the configuration parameters may include one or more of a feature model(s), a prediction model(s), a filter criteria(s), an action mapping(s). In general, the feature model may be trained to derive events based on sensor data and/or raw event information. The prediction model may predict events based on derived events, raw events, and/or sensor data. The action mappings may map predicted events to messages to include in the action feedback. The filter criteria may include information responsive by the real-time platform 102 to control how information flows into, within, and out of the real-time platform 102. Alternatively or in addition, the filter criteria may reduce a number of events derived or predicted by the real-time platform. For example, that the real-time platform 102 may select, based on the filter criteria, information that should be evaluated and information that should be ignored through various stages of the real-time platform 102. The feature model, the prediction model, the action mapping, and the filter criteria is described in reference to FIGS. 2-5 below.

The learning platform 104 may receive sensor data and/or raw events generated by the computer-augmented environment 106 and/or the real-time platform 102. In some examples, the real-time platform 102 may reformat the sensor data to a predetermined format that is compliant with the learning platform 104. For example, the predetermine format may include data structure definitions, or some other structure that can be parsed by the learning platform 104 (for example through an API call). During operation, multiple real-time platforms may forward information to the learning platform 104. The learning platform 104 may aggregate the data and refine models, logic, and other parameters accessed by the real-time platform 102. Thus, refinement and improvement of the real-time platform 102 may occur offline and, in some examples, concurrent with operation of the real-time platform 102.

The computer-augmented environment 106 may provide extended reality. Extended reality may include, for example, augmented reality (AR), augmented virtuality (AV), and/or virtual reality (VR). The computer-augmented environment 106 may include one or more display device 108, audio device 110, sensor 112 and/or actuator 114. The display device 108 may include, for example, a headset that displays visual information to its wearer. Alternatively or in addition, the display device may income a hardware or interface configured to receive and display visual content. An audio device, may include playback hardware configured to emit audible sound based on audio information. The actuator device may provide physical feedback, such as haptic feedback, to a user. A sensor may include a device that that detects and/or measures physical properties. The sensor may include, for example, a haptic sensor, a biometric sensor, a microphone, a camera, a motion sensor, a gyroscope, or any other device that detects properties of a physical space or of a user. The haptic sensor may include, for example, a tactile sensor that measures an amount of force applied to surface by a user. The biometric sensor may include, for example, a sensor that detects a physical characteristic or state of a user that is unique to the user.

In some examples, the computer-augmented environment 106 may include devices that determine raw events based on the sensor information (or other information), provide application programming interfaces to interact with the devices of computer-augmented environment, and/or communicate sensor data or raw events. The computer-augmented environment 106 may include devices that stream information based on one or more sessions established with a communications protocol such as APACHE Kafka or some other suitable messaging service. The real-time platform and/or the learning platform 104 may receive information from the computer-augmented environment 106, or devices included in the computer-augmented environment 106.

As described herein, sensor data may refer to information received by a sensor and/or information derived from signals provided by a sensor. For example, sensor data may include measurements of physical properties or physical changes. In some examples, the sensor data may include movement data. Alternatively or in addition, the sensor data may include locations of a physical object, such as a human body part or an object in a physical space. Alternatively or in addition, the sensor data may include audio and video information. In some examples, the sensor data may include a biometric response of a user, such as heart rate, pupil dilation etc.

As described herein, an event refers to a feature derived from sensor data or other events. The event may represent a classification or grouping of sensor data or events. Alternatively or in addition, the event may represent a sequence, pattern, timing, or change of sensor data or events. In other examples, an event may include satisfaction of a condition or step in a process based on criteria, rules, or logic.

Throughout the discussion herein events may be qualified as raw events, derived events and/or predicted events. A raw event may include an event derived from sensor data outside of the real-time platform 102 and/or the learning platform 104. For example, the computer-augmented environment 106, or some other system, may generate the raw events. A derived event may include an event derived based on sensor data, raw events, other derived events, and/or other information. For example, the derived event may include an event derived by the real-time platform 102 and/or the learning platform 104 using various models, statistical analysis, machine learning, or other analysis. A predicted event may include an event forecasted based on one or more derived event, raw event, and/or sensor data.

Figure 2:
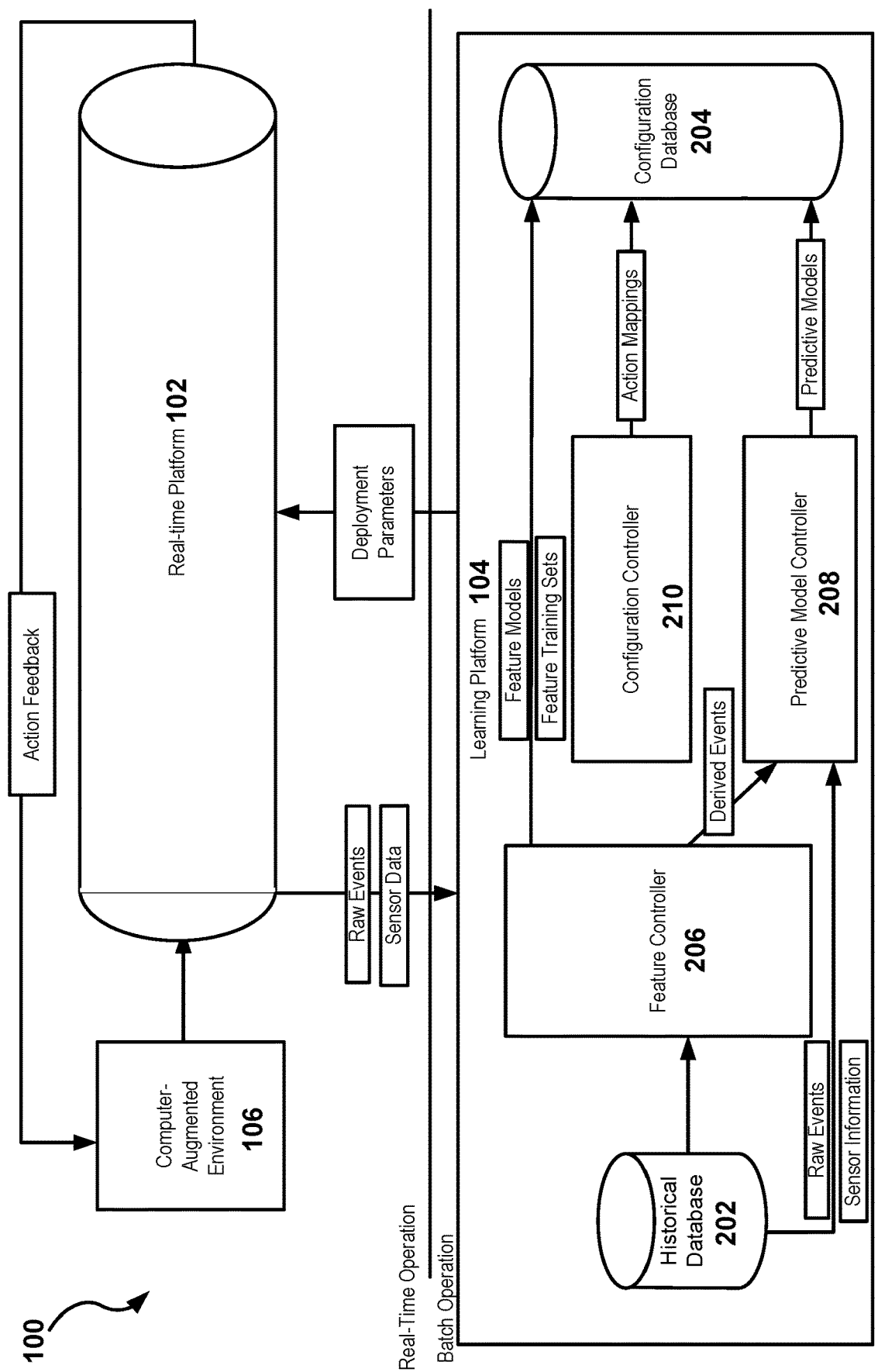
FIG. 2 illustrates an example of a learning platform.

FIG. 2 illustrates an example of the learning platform 104. The learning platform 104 may generate models, logic, settings, and other parameters for the real-time platform 102. For example, the learning platform 104 may provide the real-time platform 102 with configuration parameters that cause the real-time platform 102 to derive events from sensor data, predict events, and/or generate action feedback for the computer-augmented environment 106. The learning platform 104 may facilitate the generation, deployment, and/or configuration of the real-time platform 102, or components thereof.

The learning platform 104 may receive sensor data and/or raw events from one or more computer-augmented environment 106. Alternatively or in addition, one or more real-time platforms may be configured to forward information from a computer-augmented environment 106 to the learning platform 104. For example, a dedicated client configured in the computer-augmented environment 106 and/or real-time platform 102 may consume data and push the data to learning platform 104.

The learning platform 104 may include a historical database 202. The historical database 202 may include an organized set of data stored and accessed electronically. The historical database 202 may store sensor data, raw event information, or other information originated by the computer-augmented environment 106 and/or the real-time platform 102. The information stored in the historical database 202 may be accessed by the learning platform 104 in batch while the real-time platform 102 processes sensor data in real time.

The learning platform 104 may include a configuration database 204. The configuration database 204 may include an organized set of data stored and accessed electronically. The configuration database 204 may include the models, logic, and/or parameters generated or updated for the real-time platform 102 (or multiple deployments of real-time platforms). The configuration database 204 may include a repository of information that is associated with various types of computer-augmented environments, types of real-time platforms, user identifiers, account identifiers, etc. The learning platform 104 may access information from the configuration database 204 when generating, deploying, and/or configuring the real-time platform 102, or components thereof.

The learning platform 104 may include a feature controller 206. The feature controller 206 may access historical data from the historical database 202. The feature controller 206 may organize the information into feature training sets. A feature training set may include mappings between input and output features. For example, the feature training model may associate sensor data with event data. The mappings may be human or machine generated. Over time, the mappings may be updated to improve the accuracy and confidence of the feature model generated by the feature training set.

A feature model may include conditions, statistical models, and/or logic configured to perform feature extraction. By way of example, the feature model may include a learned or inferred function based on supervised learning. Examples of the feature model may include rules-based, geometrical, or simple counting methods. In operation, the feature model may be accessed to derive events based in input sensor data and/or raw events. Events are generated in order to summarily describe the behavior of the user.

By way of example, an event may capture or quantify the focus of a user. For example, the event may include may include an occurrence (or a number of accordance's of) looking (or not looking) at objects of interest. For deriving such an event, a list of objects of interest, along with their coordinates, is given to the feature model as an input (raw event), and the field of view of the user is extracted at every frame from the sensor data (i.e the VR/AR headset). Combining these two sources can give us at every frame whether an object of interest is within the field of view of the user or not.

Another example of an event is attempting to use controls that are not applicable, i.e. pressing a trigger button while not holding anything, or trying to grab something that is not in the proximity. For this derived event only the sensor data are analyzed.

In some examples, the feature model and/or the feature training set may be tailored for a particular computer-augmented environment, a type of sensor data, and/or a class of events. For example, sensor data received by the learning platform 104 may be associated with a sensor data type. The sensor data type may indicate the type of a sensor, the location of the sensor, or the type of information received by the sensor (e.g., movement data acquired from a sensor attached to a hand). Alternatively or in addition, the sensor data may be associated with a type of computer-augmented environment 106. The type of computer-augmented environment 106 may be indicative of scenario (e.g. a chemical laboratory, a manufacturing process, a driving experience, etc) that the computer-augmented environment 106 augments. In some examples, the feature training set may be configured to include data from only certainly types of sensor data, XR scenarios, and/or class of events.

The feature controller 206 may apply a feature model to determine one or more derived events based on the historical data from the historical database 202. As previously discussed, a derived event refers to an event derived from analysis of sensor data, raw events, or other information. A derived event may be indicative of movement data inside a physical space. By way of example, a derived event may include a collision between objects, hands jittering, dropping an item, touching/picking up a wrong item, facing away from an item of interest, or any other classification of sensor data.

The learning platform 104 may include a prediction model controller 208. The prediction model controller 208 may generate a prediction model based on statistical investigation analytics, machine learning, and/or conditional logic. For example, the prediction model controller 208 may identify causal or correlated relationships between events. The prediction model may generate a prediction model base on the causal or correlated relationships between events.

A prediction model may include any model or data aggregation, which includes a conditional chance of an event (or events) occurring in the future given that a previous event or events has occurred. The prediction model may include statistical summaries built on historic data and/or stored expert information. In some examples, the prediction model may predict an event is likely to occur in response to a user's movement or trajectory. The model may be based on averaging historical data and/or modelling the trajectory of an average user. Alternatively or in addition, the model may be personalized, considering individual sensor data and/or movement data for a particular user.

In some examples, the prediction model may identify events that are associated with each other based on the respective time the events that occur. For example, the prediction model controller 208 may determine, based on statistical analysis and/or machine learning frameworks, that if Event A happens at time t, Event B is likely to happen at time t+1. Alternatively or in addition, the prediction model controller 208 may determine a confidence that a first event or first sequence of events occurs after a second event or second sequence of events.

To generate the prediction model, the learning platform 104 may determine a separation time and measure a confidence of events having occurred before the separation and after the separation. The investigation analytics may include confidence measurements of multiple events and their sequential occurrence. Alternatively or in addition, the system 100 may generate confidence measurements of events appearing sequentially. The confidences may include a statistical metric, such as correlation or probability. The learning platform 104 may compile the confidences, and identifiers of the corresponding events into the predictive model.

In some examples, the prediction model controller 208 may generate a correlation matrix. The correlation matrix may include metrics indicative of a confidence of a second event occurring after a first event. Table 1 illustrates an example of a correlation matrix. In the example illustrated in Table 1, Event C is very likely (90%) to occur after an Event D. The correlation matrix enables the system 100 to predict the occurrence of an event in real-time. For example, if the system 100 derives or gains access to the 'prior' event, it may predict the probabilities of 'subsequent' events, aka the event that are about to happen.

TABLE 1

Correlation Matrix

| | | Subsequent | | | |
|---|---|---|---|---|---|
| | | EVENT A | EVENT B | EVENT C | EVENT D |
| Prior | EVENT A | 30 | 20 | 20 | 40 |
| | EVENT B | 40 | 5 | 3 | 10 |
| | EVENT C | 10 | 0 | 60 | 10 |
| | EVENT D | 50 | 0 | 90 | 30 |

The correlation matrix may be an example of a prediction model. More generally, the prediction model may include event mappings. An event mapping may include a mapping between one or more events. For example, an event mapping may include a mapping between a first event (such as event A) and a second event (such as event B). The event mapping may include a confidence metric (such as 20%) that measures the likelihood of the second event (or events) occurring after the first event (or events).

The filter criteria may enable the learning platforms and/or the real-time platform 102 to receive, evaluate, and/or predict only the information that is relevant for a particular computer-augmented environment. The filter criteria may include information that causes the real-time platform 102 to select certain data for input to the real-time platform 102, the feature model, the predictive model. Alternatively or in addition, the filter criteria may include logic that causes the real-time platform 102 to only predict certain events or output certain messages. In some examples, the filter criteria may conclude identifiers of authorized (or unauthorized) sensor devices, sensor data, communication channels, or other sources of sensor data. Alternatively or in addition, the filter criteria may include identifiers of authorized (or unauthorized) events, prediction mappings, and/or action mappings. As described in reference to FIG. 3, the real-time platform 102 may control the follow if information into, within, and out of the real-time platform based on the filter criteria.

In some examples, the event filter may be generated or configured based on confidence thresholds. A confidence threshold may include a threshold value that establishes the minimum amount of confidence for event predictions. For example, the confidence threshold may be set to 70%. Accordingly, the prediction mapping (Event D, Event C, 90%), which is shown in Table 1, would be selected from the correlation matrix.

The confidence threshold may be tuned for a particular implementation. Lower thresholds (e.g. 40% or lower) may result in a greater number of predictions at the cost of less accurate predictions. While the predictions may be less accurate, low confidence thresholds may increase the chances of warning a user of impending danger or sending some other action feedback to the user in response to a predicted event. Alternatively or in addition, high confidence thresholds (e.g. 80% or greater) may decrease the number of false predictions and increase confidence in predicted events. The optimal confidence threshold may depend on the particular computer-augmented environment and/or user, and the confidence threshold may be adjusted over time.

Confidence thresholds may be established based on a type of computer-augmented environment, a user, types of events, and/or action feedback. In an example, the type of XR session may include a chemical laboratory overlay where information is displayed to a user to assist in the preparation of chemicals in a laboratory. Because inherent danger involved in mixing chemicals, the confidence threshold(s) may be configured at 40%, or some other suitable value, in order to warn a user to avoid potential errors (inappropriately mixing volatile chemicals, performing steps out of order, etc). Alternatively or in addition, multiple confidence thresholds may be tuned based on the predicted events and/or action feedback. For example, an identifier of a predictive event or an identifier of an action feedback may be associated with a confidence threshold. For example, some action feedback associated with non-critical events may be associated with a high prediction confidence while other action feedback, such as safety warnings for dangerous events, may be associated with a lower confidence threshold.

The system 100 may further include a configuration controller 210. The configuration controller 210 may generate an action mapping. An action mapping may include a mapping between a predicted event (or multiple predicted events) and an action message. For example, the action mapping may include a table, or some other suitable data structure, that maps one or more predicted event identifier to one or more action message identifier. Table 2 illustrates an example of an action mapping.

TABLE 2

| XR Scenario | Predicted Event | Action Message |
| --- | --- | --- |
| Chemistry Lab | Incorrect mixing of chemicals | Instruction: Display warning on headset<br>Instruction: Induce haptic feedback to user's hand |
| Vehicle Driving | User falling asleep while driving | Instruction: Play audible noise through speaker |

An action message may cause the computer-augmented environment 106 (or component of the computer-augmented environment 106) to interact with a user. The action message may include information that is communicated to the user in via the computer-augmented environment 106. The action message may follow a data format native to the computer-augmented environment 106. The action message may cause the computer-augmented environment 106 to display information on a video device, playback audio through a playback device, engage actuators, such as a haptic actuator, or perform any other action that causes the user to receive sensory information. In some examples, the action message may include an instruction, an API call and/or a message formatted according to formatting standards governed by the computer-augmented environment 106. Thus, the learning platform 104 may store various actions mappings for the same type of predicted event, each of the mapping tailored for a separate deployment of the real-time platform that is tailored for a particular computer-augmented environment.

Figure 3:
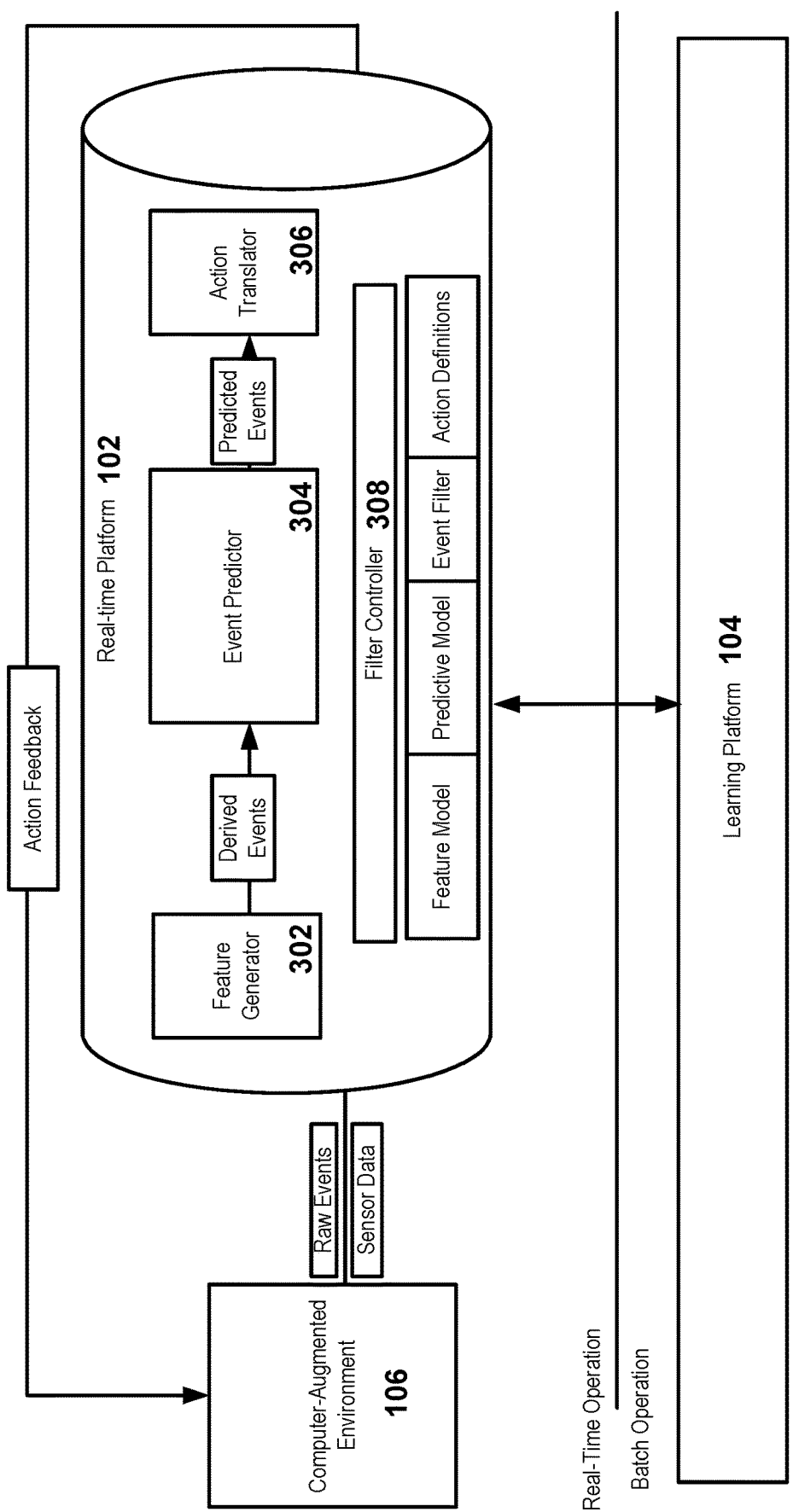
FIG. 3 illustrates an example of a real-time platform.

FIG. 3 illustrates an example of the real-time platform 102. The real-time platform 102 may include a feature generator 302. The feature generator 302 may determine events based on sensor data and/or events provided by the computer-augmented environment 106. For example, the feature generator 302 may derive events based on the feature model 110. As discussed in reference to FIG. 2, the feature model may include logic that identifies a derived event based on input data, such as sensor data. The feature generator 302 may access the feature model to generate events based on sensor data and/or raw events communicated to the real-time platform 102.

The feature model may be configured on the real-time platform 102 by the learning platform 104. For example, the real-time platform 102 may receive the feature model during deployment. Alternatively or in addition, the real-time platform 102 may receive new or updated feature models from the learning platform 104 as the feature model is improved.

The real-time platform 102 may further include an event predictor 304. The event predictor 304 may predict one or more events based on a derived event, raw events, and/or sensor data. The event predictor 304 may access a prediction model to predict events. As discussed in reference to FIG. 2, the prediction model may include predictive mappings, logic, rules, or other information that cause the event predictor 304 to identify an output event based on one or more input events or sensor data. The output event may be the prediction of an event occurring in response to the input event and/or sensor data. The output event may be associated with a confidence metric.

The real-time platform 102 may further include an action translator 306. The action translator 306 may generate the action feedback in response to one or more predicted events. For example, the action translator 306 may access action mappings. As discussed in reference to FIG. 2, the action mappings may map one or more event prediction to one or more action message. Accordingly, the action translator 306 may identify the action messages associated with a predicted event or combination of predicted events. The action translator 306 may combine the action messages into the action feedback. In some examples, the action messages may be combined with other one or more instructions that are native to the computer-augmented environment 106 and cause the computer-augmented environment 106 to communication information to a user of the computer-augmented environment 106. For example, the action feedback may include an instruction that causes the computer-augmented environment 106 (or any component thereof) to display information on a video device, playback audio through a playback device, engage actuators, such as a haptic actuator, or perform any other action that causes the user to receive sensory information.

Depending on the implementation, only certain sensor data, derived events, event predictions and/or action feedback may be relevant to an instance of a real-time platform 102. Deriving or predicting events that are not relevant to a particular computer-augmented environment may decrease performance and/or other otherwise inefficiently allocate computing resources. Accordingly, the real-time platform 102 may be tailored to optimize the real-time responsiveness for particular computer-augmented environments. For example, the real-time platform 102 may be deployed or dynamically configured with a feature model, a prediction model, filter criteria, and/or action mappings.

The real-time platform 102 may include a filter controller 308. The filter controller 308 may control the flow of information through the various stages of the real-time platform 102. The filter controller 308 may be responsive to information provided by the filter criteria. For example, the filter criteria may cause only certain sensor data to reach the real time feature generator 302. For example, the filter criteria may identify one or more types of sensor information, one or more communication channel, and/or one more sensor device of the computer-augmented environment 106. The filter controller 308 may cause, based on the filter criteria, the feature generator 302 to receive data only from the identified communication channel or sensor device. Alternatively or in addition, the filter controller 308 may cause the feature generator 302 to receive the identified type of sensor data.

In some examples, the filter controller 308 may cause the feature generator 302 to derive only certain events. For example, the filter criteria may identify the events to derive with the feature model. The feature generator 302 may derive only the events identified by the filter criteria and not derive other events. Alternatively or in addition, the feature controller 206 may cause the feature generator 302 to receive only the sensor data that can be used to derive features with a high confidence level.

In some examples, the filter controller 308 may cause the event predictor 304 to predict only certain events. For example, the filter criteria may identify events to predict with the prediction model. The event predictor 304 may predict only the events identified in the filter criteria. Alternatively or in addition, the filter criteria may include identifiers of predictive mappings. The event predictor 304 may select prediction mappings associated with the identifiers. The event predictor 304 may perform event predictions only with the selected prediction mappings.

In other examples, the filter controller 308 may compare the confidence values with the output of the prediction model based on one or more confidence thresholds. For example, the filter criteria may include one or more confidence threshold. The filter controller 308 may cause the event predictor 304 to ignore predictive mappings associated with a confidence score less than the confidence threshold.

Figure 4:
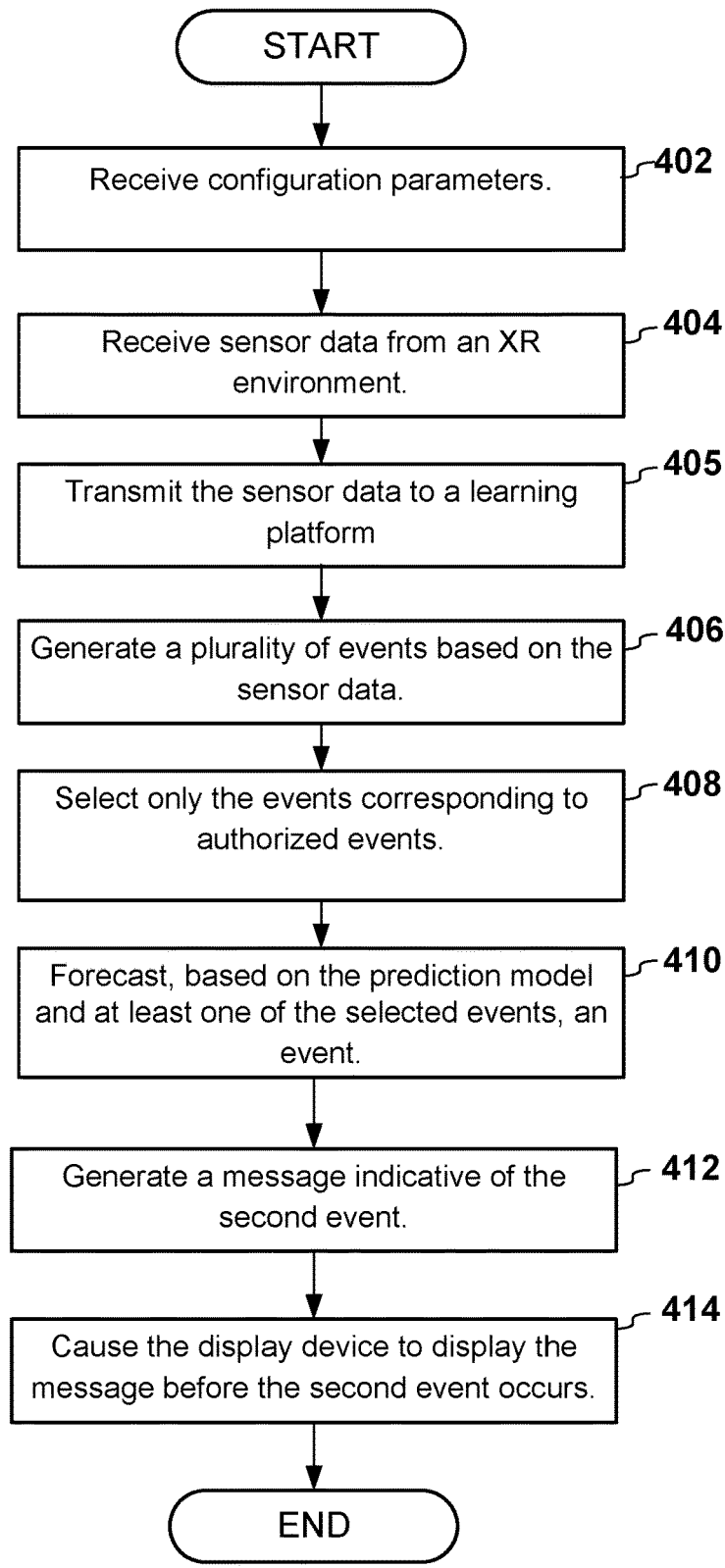
FIG. 4 illustrates an example of a flow diagram for logic of a real-time platform.

FIG. 4 illustrates an example of a flow diagram for logic of the real-time platform 102. The real-time platform 102 may receive configuration parameters (402). The configuration parameters may include configuration settings and/or logic for the real-time platform 102. For example, the configuration parameters may include the feature model, the prediction model, the filter criteria, the action mappings, and/or any other component of the real-time platform 102. The filter criteria may include authorized event identifiers. The authorized event identifiers correspond to events that can be permissibly processed by the real-time platform.

The real-time platform 102 may receive sensor data from the computer-augmented environment 106 (404). The real-time platform 102 may transmit the sensor data to the learning platform (405).

The sensor data may be originated or derived from sensors included in the computer-augmented environment 106. The real-time learning platform 102 may forward the sensor data to the learning platform 104 to improve the feature model, the prediction model, and/or the filter criteria. The real-time platform may continue processing the sensor data while the learning platform 104 updates the models. The real-time platform 102 may receive updated configuration parameters. The updated configuration parameters may include an updated filter criteria, an updated prediction model, and/or a updated feature model. The real-time platform 102 may replace one or more of the previously configured models with one or more updated models. Alternatively or in addition, the real-time platform 102 may replace the previously configured filter criteria with the updated filter criteria.

The real-time platform 102 may generate a plurality of events based on the sensor data (406). The real-time platform 102 may provide the sensor data as inputs to a feature model. The feature model may identify one or more events based on the sensor data. In some examples, the event(s) may be indicative of movement in the physical space. The feature model may be previously trained based on mappings between sensor data and predetermined events.

In some examples, the sensor data may include measurements originated by or derived from a plurality of sensors. The sensor measurements may include, for example, spatial coordinates of respective physical objects. The physical objects may be visible in the field of view of a user of the computer-augmented environment 106. Alternatively or in addition, the physical objects may be detected by a sensor (such as a video camera) of the computer-augmented environment 106. The real-time platform 102 may compare the spatial coordinates of the respective physical objects to determine that the physical objects are moving. For example, the real-time platform 102 may determine that a first object (such as a hand) is moving closer to a second object.

In some examples, the real-time platform may determine, based on the feature model and the sensor data, a pattern of location information corresponding to physical objects. The patterns may be associated with events. Thus identification of one or more patterns may cause the real-time platform to generate the event associated with the pattern.

The real-time platform 102 may select the events corresponding to authorized events. For example, the filter criteria may include authorized event identifiers. The authorized event identifiers may correspond to events that are authorized for processing with the prediction model. The real-time platform may permit events identified by the authorized event identifiers to be provided as inputs to the event predictor 304 and/or the action translator 306. Alternatively or in addition, the real-time platform may restrict events not identified by the authorized event identifiers from being provided to the event predictor 304 and/or the action translator 306.

The real-time platform 102 may forecast, based on the prediction model and at least one of the selected events, an event (410). For example, the real-time platform may access provide, as inputs to a machine learning framework, the prediction model and/or the selected event(s). Alternatively or in addition, the real-time platform may perform may derive a confidence metric and/or an event prediction based on the prediction model and the selected event(s).

The real-time platform 102 may generate a message indicative of the forecasted event (412). For example, the real-time platform 102 may determine the forecasted event is mapped to a message based on action mappings provided to the real-time platform 102. The action mappings may include one or more associations between events and actions messages, such as the action messages previously discussed in reference to FIG. 2. The real-time platform 102 may select, in response to determination that the forecasted event is mapped to the message, one or more action mapping. The real-time platform 102 may extract, from the action mapping, one or more message.

The real-time platform 102 may cause the display device to display the message before the forecasted event occurs (414). For example, the real-time platform 102 may generate action feedback (see FIG. 2). The action feedback may include displayable content that can be displayed via the display device.

Figure 5:
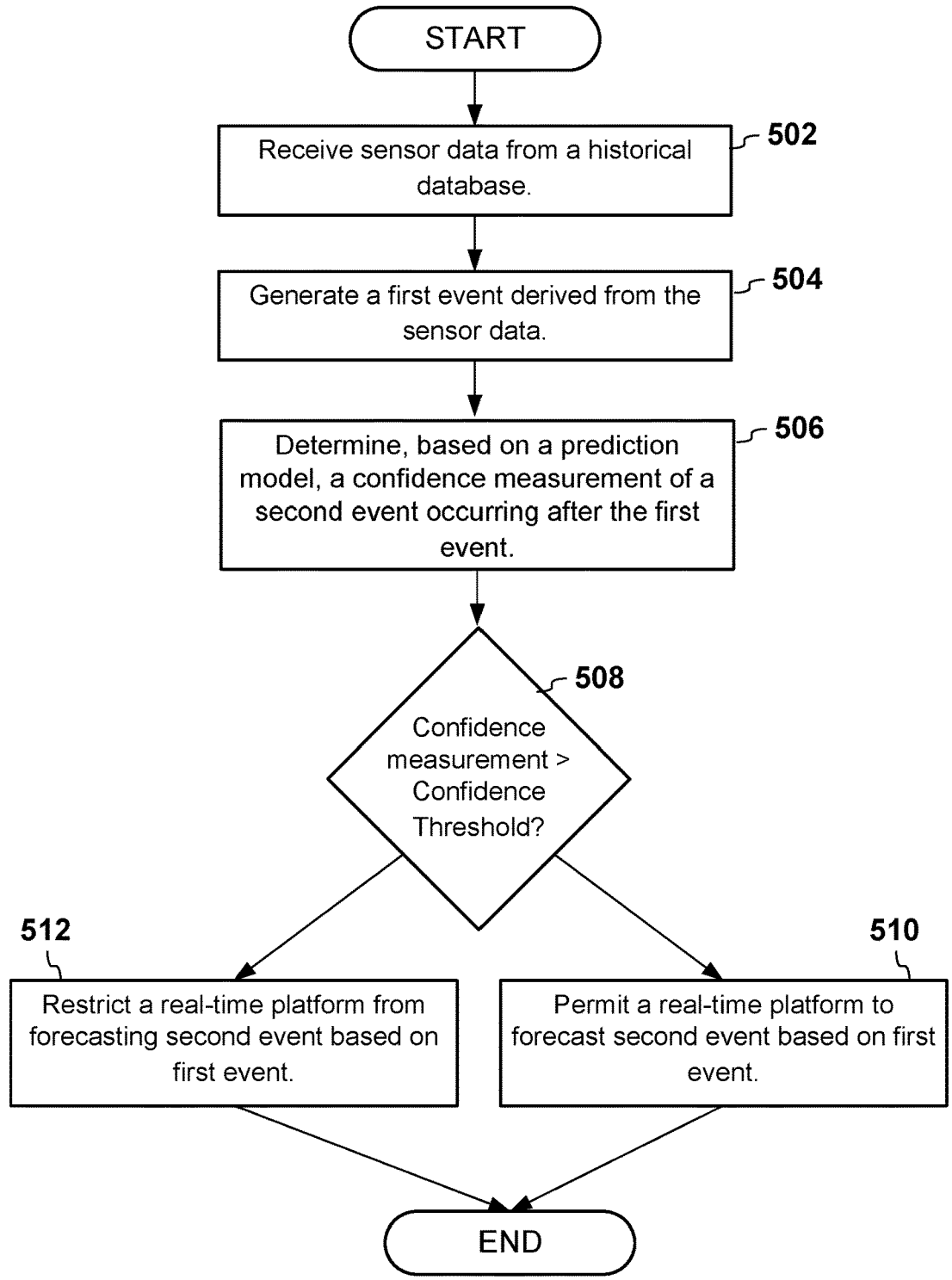
FIG. 5 illustrates an example of a flow diagram for logic of a learning platform.

FIG. 5 illustrates an example of a flow diagram for logic of the learning platform 104. The learning platform 104 may receive sensor data from the historical database 202 (502). In some examples, the learning platform may receive the sensor data from a one or more real-time platforms. Alternatively or in addition, the learning platform may receive the sensor data directly from the computer-augmented environment 106.

The learning platform 104 may generate a first event from the sensor data (504). For example, the learning platform 104 may access a training set and compile a feature model based on the training set. The learning platform 104 may apply the sensor data to the feature model to derive the first event. In some examples, the learning platform 104 may train the feature model based on the sensor data. For example, the learning platform 104 may generate mappings between the sensor data and one or more event identifier(s). The learning platform 104 may submit the training data to an artificial intelligence or machine-learning framework to compile the training date into the feature model.

The learning platform 104 may transmit the feature model to the real-time platform 102. The feature model, or associated confirmation parameters, may cause the real-time platform 102 to detect, in real time, the first event based on the sensor data and the feature model.

The learning platform 104 may determine based on a prediction model, a confidence measurement of a second event occurring after the first event (506). For example, the learning platform 104 may perform analysis of the first event (or events) and with the prediction model. In some examples, the learning platform 104 may submit the prediction model and the event data to a machine learning framework. Alternatively or in addition, the prediction model may include predictive mappings associated with respective confidence measurements, as previously discussed. The learning platform 104 may identify one or more predictive mappings associated with the first event. Extract the second event (or events) from the predictive mappings.

In some examples, the learning platform 104 may generate the prediction model. The learning platform 104 may store the prediction model in the configuration database 204 and/or configure the predication model on the real-time platform 102. For example, the learning platform 104 may determine a separation time and measure a confidence of events having occurred before the separation and after the separation. The investigation analytics may expand into multiple events, and the likelihood of their sequential occurrence. Alternatively or in addition, the system 100 may produce confidence measurements of events of any type appearing sequentially based on multiple users. Likelihood of events may include a statistical metric, such as correlation.

The learning platform 104 may determine whether the confidence measurement is greater than a confidence threshold (508). In some examples, the learning platform 104 may receive the confidence threshold from a user interface. For example, the learning platform 104 may generate a user interface that enables an administrator to configure instances of real-time platforms. The user interface may receive one or more confidence threshold. The confidence threshold may be modified to increase or decrease the accuracy, speed, quantity of predictions provided by the real-time platform 102. The learning platform 104 may generate updated filter criteria in response to receiving updated confidence threshold, and transmit the filter criteria to the real-time platform 102.

In response to the confidence measurement being greater than the confidence threshold, the learning platform 104 may permit the real-time platform 102 to forecast the second event based on the first event (510). In response to the confidence measurement not being rather than the confidence threshold, the learning platform 104 may restrict the real-time platform 102 from forecasting the second event best on the first event (512).

Figure 6:
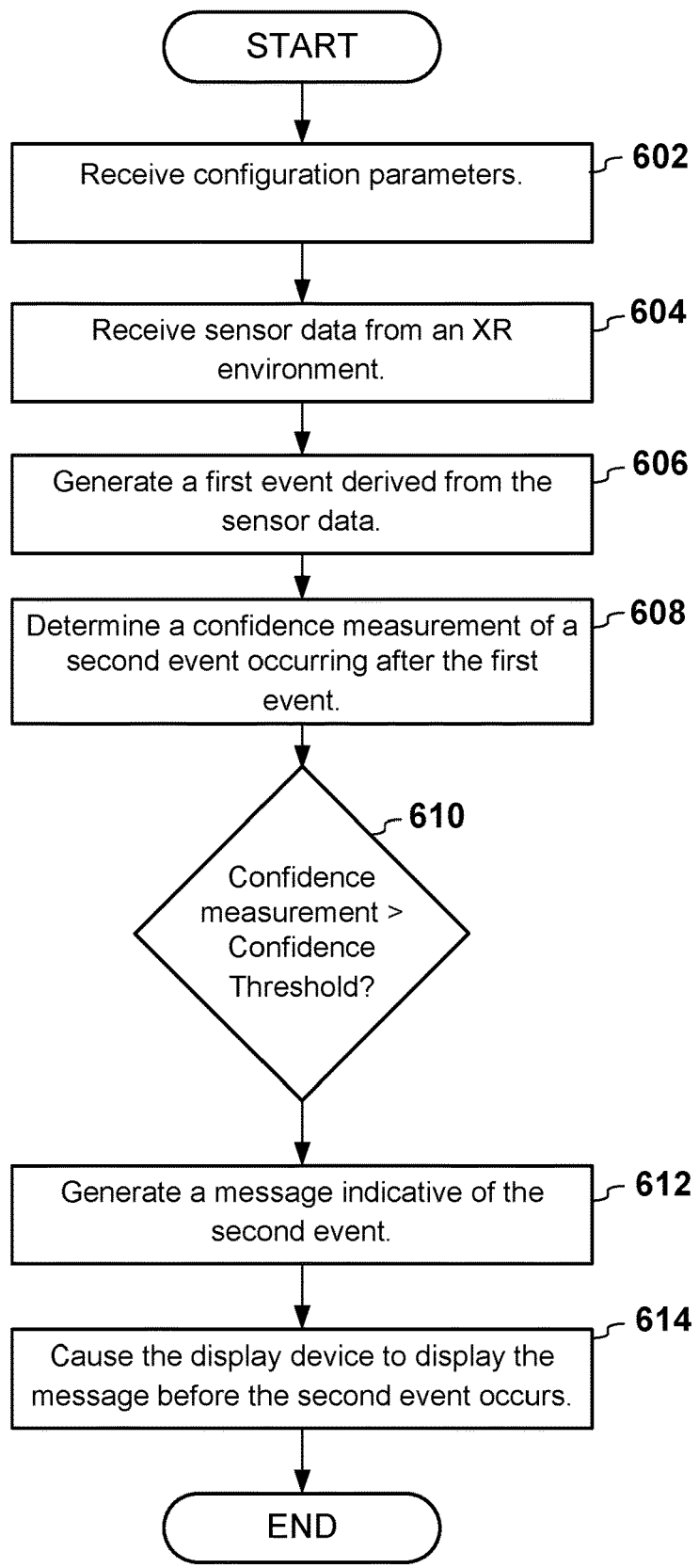
FIG. 6 illustrates a second example of logic for a real-time platform.

For example, the learning platform 104 may generate a filter criteria that authorizes or restricts a real-time platform 102 to forecast the second event with the prediction model and communicate messages to the computer-augmented environment 106 based on the second event. For example, the turning criteria may include a rule or instruction that authorizes or restricts a real-time platform 102 to forecast the second event with the prediction model and communicate messages to the computer-augmented environment 106 based on the second event. Alternatively or in addition, the filter criteria may include a plurality of authorized or restricted mapping identifiers associated with prediction model. The real-time platform 102 may only generate event predictions based on authorized mapping and not restricted mappings FIG. 6 illustrates a second example of logic for the real-time platform 102. The real-time platform 102 may receive configuration parameters (602). The configuration parameters may include configuration settings and/or logic for the real-time platform 102. For example, the configuration parameters may include the feature model, the prediction model, the filter criteria, the action mappings, and/or any other component of the real-time platform 102.

The real-time platform 102 may receive sensor data from the computer-augmented environment 106 (604). The real-time platform 102 may generate a first event derived from the sensor data (606). The sensor data may be originated or derived from sensors included in the computer-augmented environment 106. The real-time platform 102 may provide the sensor data as inputs to a feature model. The feature model may identify one or more events based on the sensor data. In some examples, the event(s) may be indicative of movement in the physical space. The feature model may be previously trained based on mappings between sensor data and predetermined events.

In some examples, the sensor data may include measurements originated by or derived from a plurality of sensors. The sensor measurements may include, for example, spatial coordinates of respective physical objects. The physical objects may be visible in the field of view of a user of the computer-augmented environment 106. Alternatively or in addition, the physical objects may be detected by a sensor (such as a video camera) of the computer-augmented environment 106. The real-time platform 102 may compare the spatial coordinates of the respective physical objects to determine that the physical objects are moving. For example, the real-time platform 102 may determine that a first object (such as a hand) is moving closer to a second object.

The real-time platform 102 may determine a confidence measurement of a second event occurring after the first event (608). For example, the real-time platform 102 may analyze one or more derived event with the prediction model. In some examples, the prediction model may include event mappings. For example, an event mapping may include an association between a first event identifier and second event identifier. The event mapping may include a confidence that the second events occurs after the first event. The real-time platform 102 may select the mappings associated with derived event (or events).

The real-time platform 102 may determine whether the confidence measurement is greater than a confidence threshold. In response to the confidence measurement not being greater than the confidence threshold (610, No), the real-time platform 102 may ignore the event. In response to the confidence measurement being greater than the confidence threshold (610, Yes) the real-time platform 102 may continuing processing the event.

By comparing the confidence measurement of a predicted event with a confidence threshold, the real-time platform 102 may selectively choose which event predictions to take action on and which event predictions to ignore. In some examples, the prediction model may include predictive mappings (such as the correlation matrix shown in Table 1 above). Each of the prediction mappings may be include a corresponding measurement. Accordingly, the real-time platform 102 may ignore the prediction mappings that are associated with corresponding confidence measurements less than the confidence threshold. Alternatively or in addition, the real-time platform 102 may acquire sensor data and/or derived events only for the prediction mappings that have a corresponding confidence higher than the prediction threshold. Thus, the real-time platform 102 may selectively choose which sensor data to acquire and which events to derive, and conserve processing power and memory by not receiving irrelevant sensor data, deriving irrelevant events, or predicting irrelevant events.

The real-time platform 102 may generate a message indicative of the second event (612). For example, the real-time platform 102 may determine the second event is mapped to a message based on action mappings provided to the real-time platform 102. The action mappings may include one or more associations between events and actions messages, such as the action messages previously discussed in reference to FIG. 2. The real-time platform 102 may select, in response to determination that the second event is mapped to the message, one or more action mapping. The real-time platform 102 may extract, from the action mapping, one or more message.

The real-time platform 102 may cause the display device to display the message before the second event occurs (614). For example, the real-time platform 102 may generate action feedback (see FIG. 2). The action feedback may include displayable content that can be displayed via the display device.

The logic illustrated in the flow diagrams may include additional, different, or fewer operations than illustrated. The operations illustrated may be performed in an order different than illustrated.

The system 100 may be implemented with additional, different, or fewer components than illustrated. For example, the system may include the learning platform 104 and/or the real-time platform 204 with or without the computer-augmented environment. Alternatively or in addition, the computer-augmented environment many include the learning platform 104 and/or the real-time platform. Each component may include additional, different, or fewer components.

Figure 7:
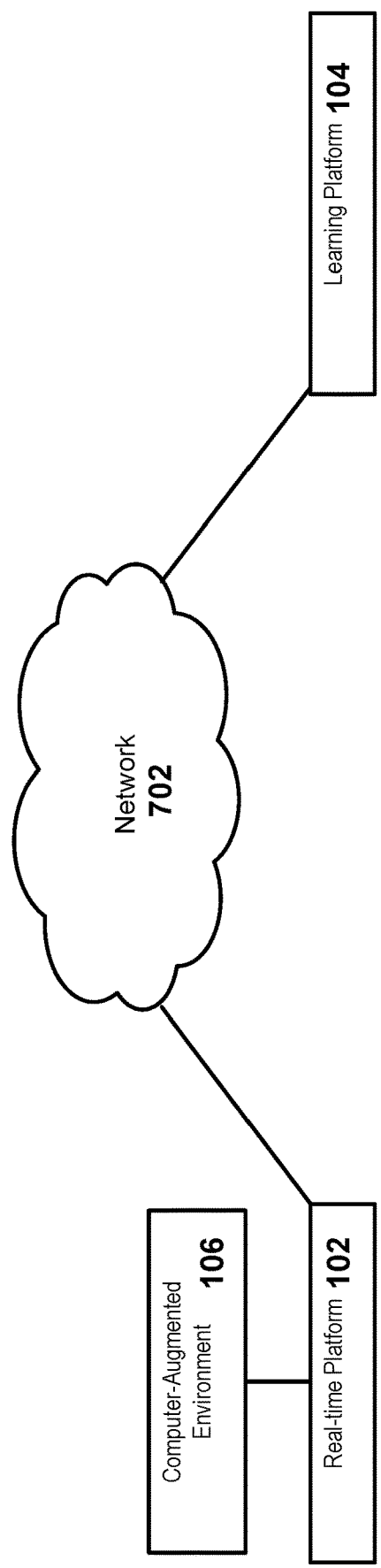
FIG. 7 illustrates a second example of a real-time feedback system.

FIG. 7 illustrates a second example of the system 100. The real-time platform 102 may communicate with the learning platform 104 by way of network 702. The network may include any physical or virtual system where information is exchanged between data links. For example, the network may include a computer network, such as an IP-based network where multiple interconnected nodes relay information according to a network protocol. The network may be a local network where physical devices are located in proximity to each other or a wide area network, such as the internet.

In some examples, the real-time platform 102 may be physically remote from the learning platform 104, and separated by network 702. For example, the learning platform 104 may be configured on a server or cloud based system while the real-time platform 102 is located proximate to the computer-augmented environment 106. Alternatively or in addition, the real-time platform 102 may be share the same hardware resources as computer-augmented environment, or a portion thereof. In other examples, the real-time platform 102 may communicate with the computer-augmented environment by way of a local network, or some other network that is not connected with the learning platform 104. Keeping the real-time platform 102 proximate to the computer-augmented environment 106 may facilitate faster performance in terms of latency, bandwidth, and other performance considerations. In other examples, the real-time platform 102 may communicate, the self-learning platform 104, and/or the computer-augmented environment may each communicate via the network 702.

Figure 8:
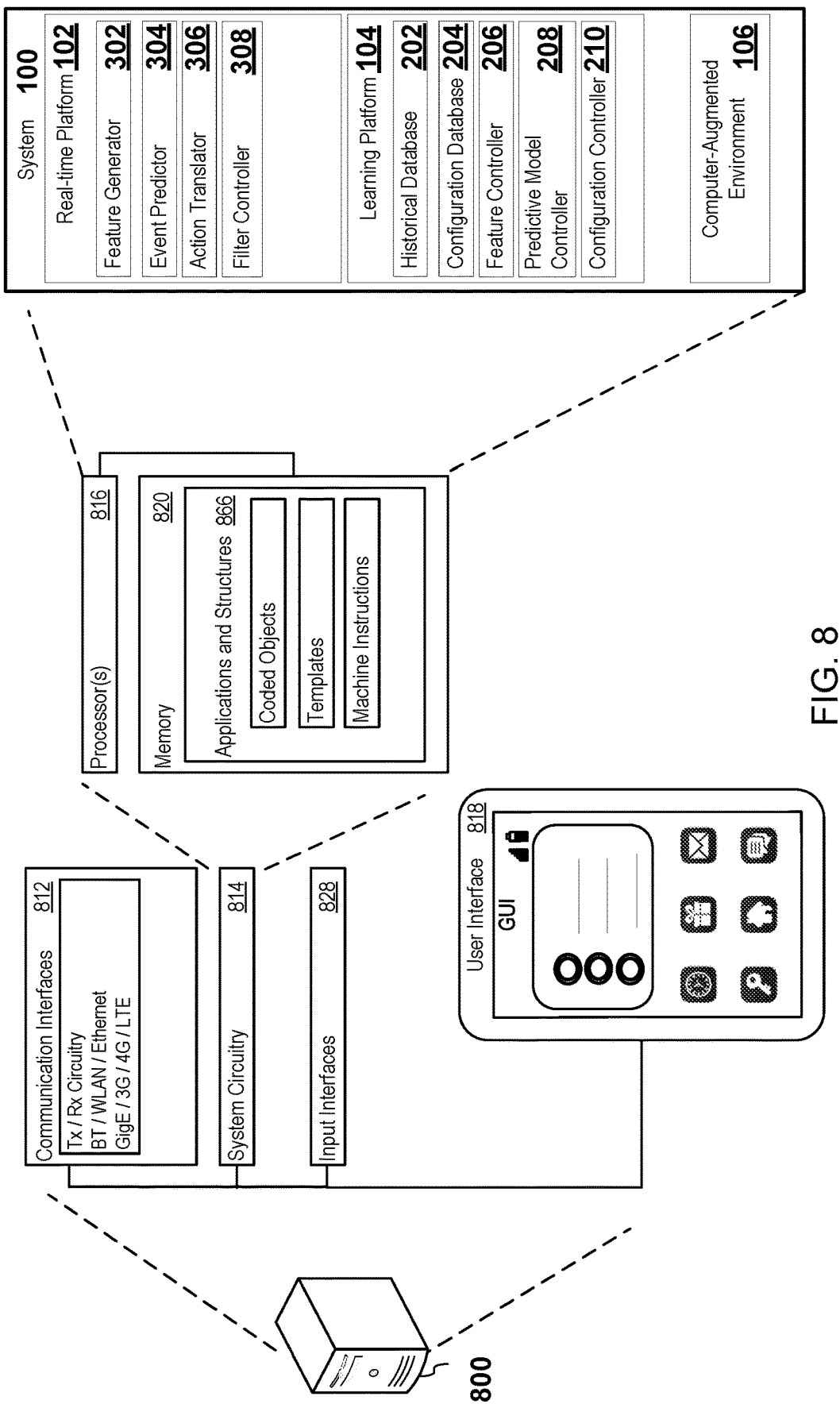
FIG. 8 illustrates an example of a computing environment for a system.

FIG. 8 illustrates an example of a computer environment 800 for the system 100. The computer environment 800 may include a hardware platform for the real-time platform 102, the learning platform 104, the computer-augmented environment 106, and/or any subcomponent therein. The computer environment 800 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the features implemented by the logic of the real-time platform 102, the feature generator 302, the event predictor 304, the action translator 306, the filter controller 308, the learning platform 104, the feature controller 206, the predictive model controller 208, the configuration controller 210, the computer-augmented environment 106, or any component or subcomponent of the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the real-time platform 102, the feature generator 302, the event predictor 304, the action translator 306, the filter controller 308, the learning platform 104, the historical database 202, the configuration database 204, the feature controller 206, the predictive model controller 208, the configuration controller 210, the computer-augmented environment 106, the system 100, or any component or subcomponent of the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the real-time platform 102, the feature generator 302, the event predictor 304, the action translator 306, the filter controller 308, the learning platform 104, the historical database 202, the configuration database 204, the feature controller 206, the predictive model controller 208, the configuration controller 210, the computer-augmented environment 106, the system 100, or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
   a processor, the processor configured to:
   receive configuration parameters from a learning platform, the configuration parameters comprising a filter criteria, a feature model, and a prediction model, the filter criteria comprising a plurality of authorized event identifiers;
   receive, in real time, sensor data from a computer-augmented environment, the computer-augmented environment comprising a display device configured to display content related to a physical space;
   transmit the sensor data to the learning platform, wherein the learning platform is configured to train, based on the sensor data, the prediction model and the feature model;
   determine, based on the feature model and the sensor data, a pattern of location information corresponding to physical objects, the pattern associated with respective events;
   generate a plurality of events derived from the sensor data and the determined patterns, the events indicative of movement in the physical space;
   select, from the generated events, events corresponding to the authorized event identifiers included in the filter criteria;
   forecast, based on the prediction model and at least one of the selected events, a forecasted event;
   generate an action message indicative of the forecasted event; and
   cause the computer-augmented environment to display the action message before the forecasted event occurs.

2. The system of claim 1, wherein the computer-augmented environment comprises an extended reality (XR) environment, the system further comprising:
   a headset configured to display a virtual scene on the display device, wherein the processor is further configured to instruct the headset to display information included in the action message.

3. The system of claim 1, wherein the processor is further configured to:
   determine the forecasted event is associated with an action mapping included among a plurality of action mappings, the action mappings comprising associations event identifiers and respective action messages;
   select, in response to determination that the forecasted event is associated with the action mapping, the action mapping from the action mappings; and
   extract the action message from the selected action mapping.

4. The system of claim 1, wherein the sensor data is received from a haptic sensor, a biometric sensor, or a combination thereof.

5. The system of claim 1, wherein the sensor data comprises sensor measurements created by a plurality of sensors, the sensor measurements comprising location information of the physical objects in the physical space.

6. The system of claim 5, wherein, the feature model comprises instructions that cause the processor to:
   determine, based on the feature model and the sensor data, movement information, event information, or a combination thereof, the pattern of the physical objects, the pattern associated with the at least one of the selected events.

7. The system of claim 6, wherein the processor is further configured to:
   receive updated configuration parameters, the updated configuration parameters comprising an updated filter criteria and an updated prediction model;
   replace the filter model with the updated filter model; and
   replace the prediction model with the updated prediction model.

8. A method comprising:
   receiving sensor data from a historical database, the sensor data created by a plurality of sensors included in a computer-augmented environment;
   generating a first event derived from the sensor data;
   determining, based on a prediction model, a confidence measurement of a second event occurring after the first event;
   determining the confidence measurement is greater than a confidence threshold;
   generating, in response to the confidence measurement being greater than the confidence threshold, a filter criteria that authorizes a real-time platform to forecast the second event with the prediction model and communicate messages to computer-augmented environment based on the second event; and transmitting the filter criteria and the prediction model for receipt by the real-time platform.

9. The method of claim 8, further comprising:

training a feature model based on the sensor data, wherein generating the first event further comprises identifying the first event based on the feature model and the sensor data.

10. The method of claim 9, further comprising:

transmit the feature model to the real-time platform, wherein the feature model is configured to cause the real-time platform to detect, in real time, events based the sensor data and the feature model.

11. The method of claim 8, further comprising:

receiving the sensor data from a plurality of real-time platforms; and store the sensor data in the historical database.

12. The method of claim 8, further comprising:

generate a user interface comprising a field to receive the confidence thresholds; and receive, in response to user interaction with the user interface, the confidence threshold provided to the user interface.

13. The method of claim 8, further comprising:

generate an action mapping, the action mapping comprising an association between the second event and a message; and transmitting the action mapping to the real-time platform, the action mapping configured to cause the real-time platform to communicate an action message to the computer-augmented environment in response to forecasting the second event.

14. The method of claim 13, further comprising:

generating a graphical user interface comprising a plurality of fields; and receiving, in response to user interaction with the graphical user interface, the action mappings from the fields of the graphical user interface.

15. A method, comprising receiving sensor data from a computer-augmented environment configured to display an interactive overlay for a physical space in real time;

obtaining a feature model, a prediction model, and a filter criteria, the feature model trained to derive events based on the sensor data, the prediction model comprising a plurality of predictive mappings between event identifiers, and the filter criteria comprising a plurality of authorized event identifiers; and generating, in real-time, display content for the computer-augmented environment based on the sensor data by:

deriving, based on the feature model and the sensor data, a first event indicative of movement in the physical space, determining the first event is associated with an authorized event identifier included in the filter criteria, forecasting, based on the authorized event identifier and the prediction model, that a second event occurs after the first event, and transmitting an action message to the computer-augmented environment, the action message indicative of the second event.

16. The method of claim 15, further comprising:

updating, in batch, the feature model, the prediction model and the filter criteria by:

storing the received sensor data in a database comprising historical sensor data; and generating, based on the stored sensor data, an updated feature model, an updated prediction model, an updated filter criteria, or any combination thereof, concurrent with generating, in real time, display content for the computer-augmented environment.

17. The method of claim 16, further comprising:

replacing, in a memory, the feature model, the prediction model, and the filter criteria with the updated feature model, the updated prediction model and the updated filter criteria.

18. The method of claim 15, further comprising:

updating, in batch, the feature model by:

adding, to a feature training set, a mapping between the stored sensor data and a corresponding event; and training, based on a machine learning framework, an updated feature model based on the feature training set.

19. The method of claim 15, further comprising updating, in batch, the prediction model and the filter criteria by:

storing the received sensor data in a database comprising historical sensor data;

training, the prediction model based on the historical sensor data, the prediction model configured to provide a confidence measurement of the second event occurring after the first event;

determining the confidence measurement is greater than a confidence threshold; and including an identifier of the first event in the filter criteria in response to determination that the confidence measurement is greater than the confidence threshold.

20. The method of claim 15, further comprising:

causing the computer-augmented environment to display content included in the action message before the second event occurs.

* * * * *